(12) United States Patent
Nakamura (10) Patent No.: US 9,703,149 B2
(45) Date of Patent: Jul. 11, 2017

(54) LIQUID CRYSTAL DISPLAY PANEL

(71) Applicant: Japan Display Inc., Minato-ku (JP)

(72) Inventor: Masato Nakamura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 41 days.

(21) Appl. No.: 14/710,313

(22) Filed: May 12, 2015

(65) Prior Publication Data
US 2015/0241726 A1    Aug. 27, 2015

Related U.S. Application Data

(63) Continuation of application No. 13/958,905, filed on Aug. 5, 2013, now Pat. No. 9,069,214.

(30) Foreign Application Priority Data

Aug. 6, 2012 (JP) .................................. 2012-173824

(51) Int. Cl.
| | | |
|---|---|---|
| G02F 1/1343 | (2006.01) | |
| G02F 1/1339 | (2006.01) | |
| G02F 1/1362 | (2006.01) | |
| G02F 1/1333 | (2006.01) | |
| G02F 1/1337 | (2006.01) | |

(52) U.S. Cl.
CPC ...... *G02F 1/13394* (2013.01); *G02F 1/13392* (2013.01); *G02F 1/133345* (2013.01); *G02F 1/136209* (2013.01); *G02F 1/136286* (2013.01); *G02F 2001/13398* (2013.01); *G02F 2001/13629* (2013.01); *G02F 2001/133738* (2013.01); *G02F 2201/40* (2013.01)

(58) Field of Classification Search
CPC ........... G02F 1/13394; G02F 1/133345; G02F 1/13392; G02F 1/136286; G02F 1/136209
See application file for complete search history.

(56) References Cited

U.S. PATENT DOCUMENTS

| | | | |
|---|---|---|---|
| 6,624,866 B2 * | 9/2003 | Matsumoto | ....... G02F 1/134363 349/139 |
| 8,704,994 B2 | 4/2014 | Kwak | |
| 2012/0019748 A1 * | 1/2012 | Kim | .................. G02F 1/133512 349/106 |

FOREIGN PATENT DOCUMENTS

| | | |
|---|---|---|
| JP | 2002-90721 | 3/2002 |
| JP | 2004-252309 A | 9/2004 |
| JP | 2007-179077 A | 7/2007 |
| JP | 2009-204681 A | 9/2009 |
| JP | 2012-93743 A | 5/2012 |

OTHER PUBLICATIONS

Japanese Office Action issued Mar. 8, 2016 in Patent Application No. 2012-173824 (with English language translation).

* cited by examiner

*Primary Examiner* — James Dudek
(74) *Attorney, Agent, or Firm* — Oblon, McClelland, Maier & Neustadt, L.L.P.

(57) ABSTRACT

According to one embodiment, a liquid crystal display panel includes an array substrate, a counter-substrate, a liquid crystal layer and a columnar spacer. The array substrate includes a wiring including projection portion which form a dot pattern with light-blocking properties, and a first horizontal alignment film. The counter-substrate includes a second horizontal alignment film. The columnar spacer is disposed between the array substrate and the counter-substrate and is located within the dot pattern.

10 Claims, 11 Drawing Sheets

LIQUID CRYSTAL DISPLAY PANEL

CROSS-REFERENCE TO RELATED APPLICATIONS

This application is a continuation of U.S. application Ser. No. 13/958,905 filed Aug. 5, 2013, and is based upon and claims the benefit of priority from Japanese Patent Application No. 2012-173824, filed Aug. 6, 2012, the entire contents of each of which are incorporated herein by reference.

FIELD

Embodiments described herein relate generally to a liquid crystal display panel.

BACKGROUND

In recent years, liquid crystal display panels with a light weight, small size and high fineness have been developed as display panels. In general, a liquid crystal display panel includes an array substrate, a counter-substrate which is arranged opposite to the array substrate with a predetermined gap, and a liquid crystal layer which is held between both substrates. A black matrix layer and a color filter, which includes color layers of red, green and blue, are arranged on the counter-substrate.

A plurality of columnar spacers are positioned on, for example, the array substrate. The gap between the two substrates is kept constant by the columnar spacers. Horizontal alignment films are formed on the array substrate and the counter-substrate, thereby restricting the alignment of liquid crystal molecules.

In the case where the columnar spacers are formed, since liquid crystal molecules in the vicinity of the columnar spacers become less reactive, there is a concern that a region in one pixel, which is usable as a region for image display, may become narrower. If this region becomes narrower, a displayed image becomes darker. In addition, since light leak occurs in the vicinity of the columnar spacers, there is a concern that the contrast ratio lowers. In order to suppress a decrease in display quality, it is possible to form the columnar spacers in a manner to overlap the black matrix layer.

DETAILED DESCRIPTION

In general, according to one embodiment, there is provided a liquid crystal display panel comprising: an array substrate comprising a wiring including projection portions which form a dot pattern with light-blocking properties, and a first horizontal alignment film; a counter-substrate comprising a second horizontal alignment film which is opposed to the first horizontal alignment film, the counter-substrate being arranged with a gap from the array substrate; a liquid crystal layer held between the array substrate and the counter-substrate; and a columnar spacer which is disposed between the array substrate and the counter-substrate and is located within the dot pattern.

According to another embodiment, there is provided a liquid crystal display panel comprising: an array substrate comprising a wiring including projection portions which form dot patterns with light-blocking properties, and a first horizontal alignment film; a counter-substrate comprising a second horizontal alignment film which is opposed to the first horizontal alignment film, the counter-substrate being arranged with a gap from the array substrate; a liquid crystal layer held between the array substrate and the counter-substrate; and a columnar spacer which is disposed between the array substrate and the counter-substrate. The dot patterns comprise regular patterns and dummy patterns. The columnar spacer is located within the regular pattern.

According to another embodiment, there is provided a liquid crystal display panel comprising: an array substrate comprising a signal line extending in a first direction and including a pair of first projection portions, a gate line extending in a second direction perpendicular to the first direction, a storage capacitance line which is disposed with a distance from the gate line in the first direction, extends in the second direction and includes a second projection portion which forms, together with the pair of first projection portions, a dot pattern with light-blocking properties, a first pixel, a second pixel which neighbors the first pixel in the first direction, with the storage capacitance line and gate line being interposed, a third pixel which neighbors the first pixel in the second direction, with the signal line being interposed, a fourth pixel which neighbors the second pixel in the second direction, with the signal line being interposed, and neighbors the third pixel in the first direction, with the storage capacitance line and gate line being interposed, a columnar spacer which is located within the dot pattern, and a first horizontal alignment film; a counter-substrate comprising belt portion with light-blocking properties, which extend in the second direction and have side edges overlapping the gate line and the storage capacitance line, and a second horizontal alignment film which is opposed to the first horizontal alignment film, the counter-substrate being arranged with a gap by the columnar spacer from the array substrate; and a liquid crystal layer held between the array substrate and the counter-substrate. One of the pair of first projection portions protrudes toward the second pixel from an intersection part between the signal line and the gate line, and the other of the pair of first projection portions protrudes toward the fourth pixel from the intersection part. The second projection portion protrudes towards the first pixel and the third pixel from an intersection part between the signal line and the storage capacitance line.

Next, a liquid crystal display device according to a first embodiment will be described in detail with reference to the accompanying drawings. In the drawings, structural elements having the same or similar functions are denoted by like reference numerals, and an overlapping description is omitted.

Figure 1:
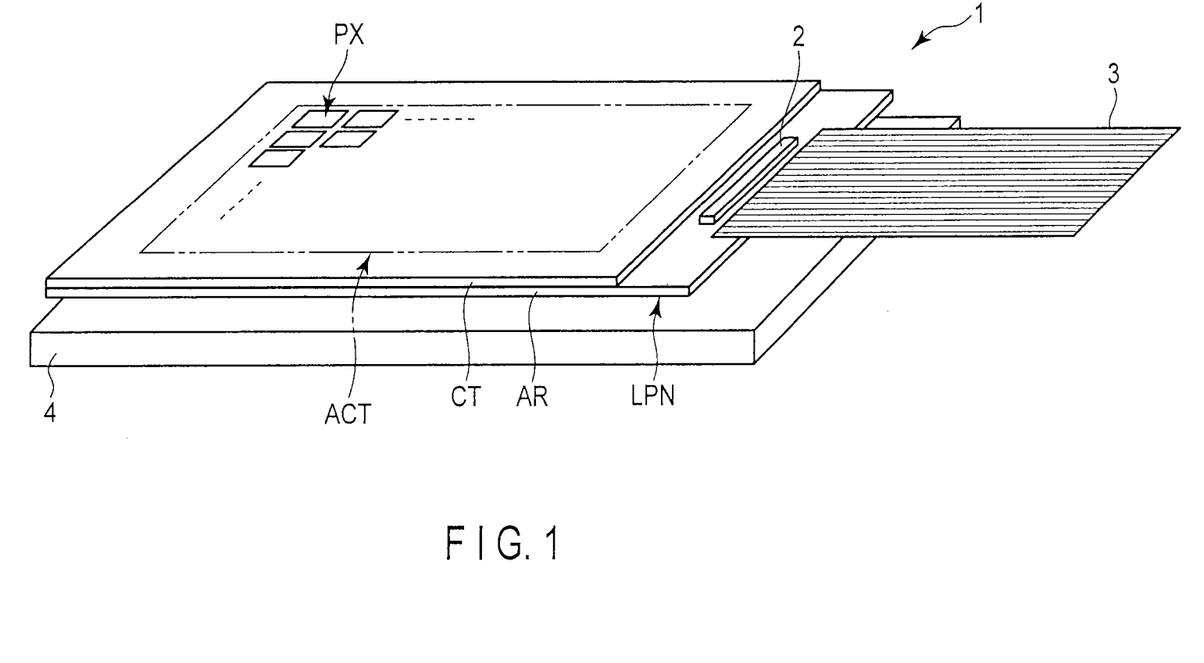
FIG. 1 is a view which schematically shows the structure of a liquid crystal display device according to a first embodiment.

FIG. 1 is a view which schematically shows the structure of the liquid crystal display device 1 according to the first embodiment.

As shown in FIG. 1, the liquid crystal display device 1 includes an active-matrix-type liquid crystal display panel LPN, a driving IC chip 2 and a flexible printed circuit 3 which are connected to the liquid crystal display panel LPN, and a backlight unit 4 which illuminates the liquid crystal display panel LPN.

The liquid crystal display panel LPN is configured to comprise an array substrate AR, a counter-substrate CT which is arranged opposed to the array substrate AR, and a liquid crystal layer (not shown) which is held between the array substrate AR and the counter-substrate CT. The liquid crystal display panel LPN includes an active area ACT which displays an image. In the active area ACT, a plurality of pixels PX which are arrayed in a matrix of m×n (m and n are natural numbers) are located.

In the example illustrated, the backlight unit 4 is disposed on the back side of the array substrate AR. As the backlight unit 4, various modes are applicable, and use may be made of either a backlight unit which utilizes a light-emitting diode (LED) as a light source, or a backlight unit which utilizes a cold cathode fluorescent lamp (CCFL) as a light source. A description of the detailed structure of the backlight unit 4 is omitted.

Figure 2:
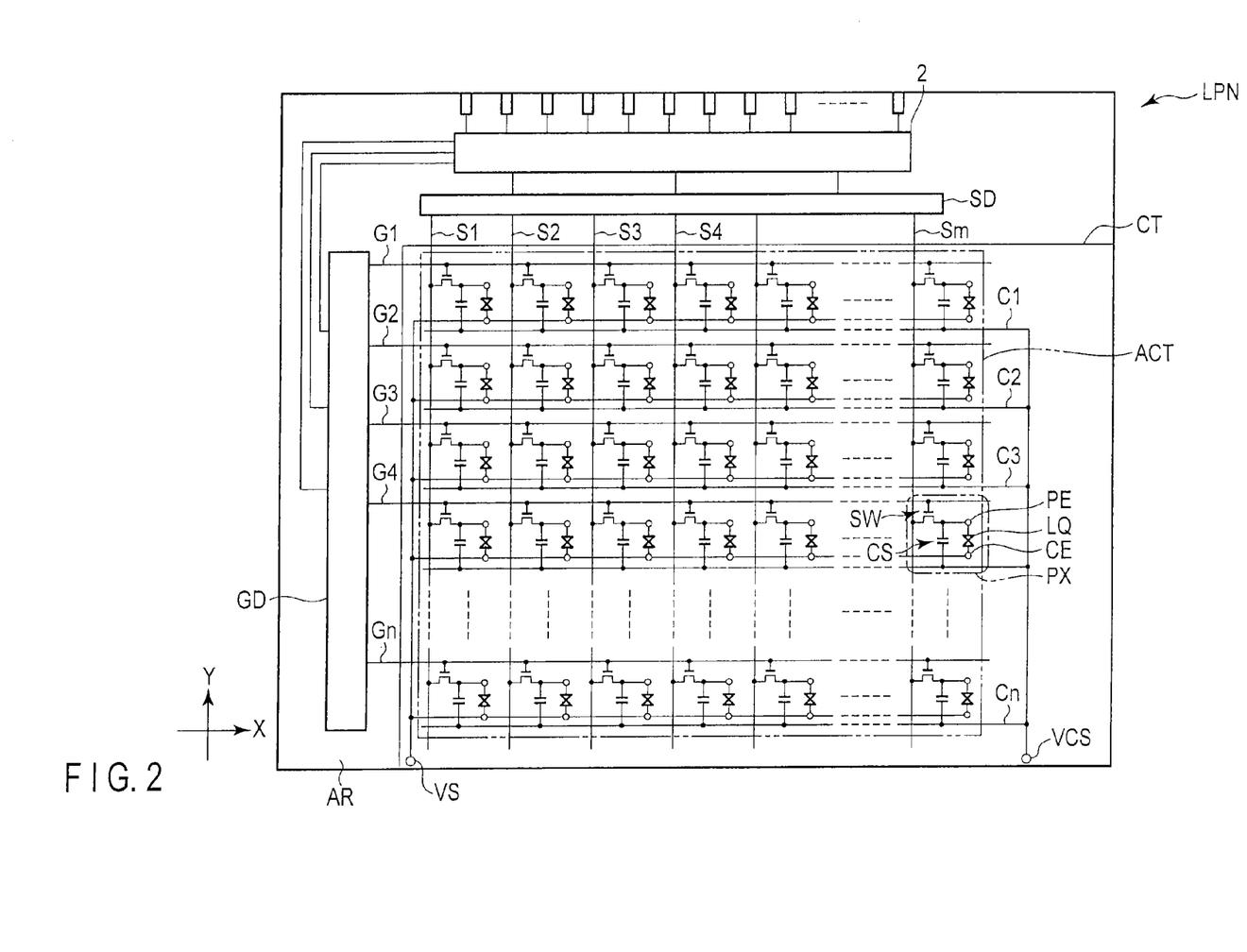
FIG. 2 is a view which schematically shows a structure and an equivalent circuit of a liquid crystal display panel shown in FIG. 1.

FIG. 2 is a view which schematically shows a structure and an equivalent circuit of the liquid crystal display panel LPN shown in FIG. 1.

As shown in FIG. 2, the liquid crystal display panel LPN includes, in the active area ACT, an n-number of gate lines G (G1 to Gn), an n-number of storage capacitance lines C (C1 to Cn), and an m-number of signal lines S (S1 to Sm). The gate lines G and storage capacitance lines C are alternately arranged in parallel along a Y direction which is a first direction. The gate lines G and storage capacitance lines C extend in an X direction which is a second direction crossing the first direction Y, but it is not always necessary that the gate lines G and storage capacitance lines C extend linearly. In this example, the first direction Y and the second direction X are substantially perpendicular to each other. The signal lines S cross the gate lines G and storage capacitance lines C. The signal lines S extend along the first direction Y, but it is not always necessary that signal lines S extend linearly.

Incidentally, a part of each of the gate lines G, storage capacitance lines C and signal lines S may be bent.

Each of the gate lines G is led out of the active area ACT and is connected to a gate driver GD. Each of the signal lines S is led out of the active area ACT and is connected to a source driver SD. At least parts of the gate driver GD and source driver SD are formed on, for example, the array substrate AR, and are connected to the driving IC chip 2 which incorporates a controller.

Each of the pixels PX includes a switching element SW, a pixel electrode PE and a common electrode CE. A storage capacitance CS is formed, for example, between the storage capacitance line C and a storage capacitance electrode F (to be described later). In the meantime, in the present embodiment, the pixel electrode PE is formed in the array substrate AR, and the common electrode CE is formed in the counter-substrate CT.

The switching element SW is composed of, for example, an n-channel thin-film transistor (TFT). The switching element SW is electrically connected to the gate line G and signal line S. In the active area ACT, an (m×n) number of switching elements SW are formed.

The pixel electrode PE is electrically connected to the switching element SW. In the active area ACT, an (m×n) number of pixel electrodes PE are formed. The common electrode CE has, for example, a common potential, and is disposed common to the pixel electrodes PE of plural pixels PX via the liquid crystal layer LQ. The storage capacitance line C is electrically connected to a voltage application module VCS to which a storage capacitance voltage is applied.

The array substrate AR includes a power supply module VS which is formed, for example, on the outside of the active area ACT. The common electrode CE is electrically connected to the power supply module VS formed on the array substrate AR via an electrically conductive member (not shown).

Figure 3:
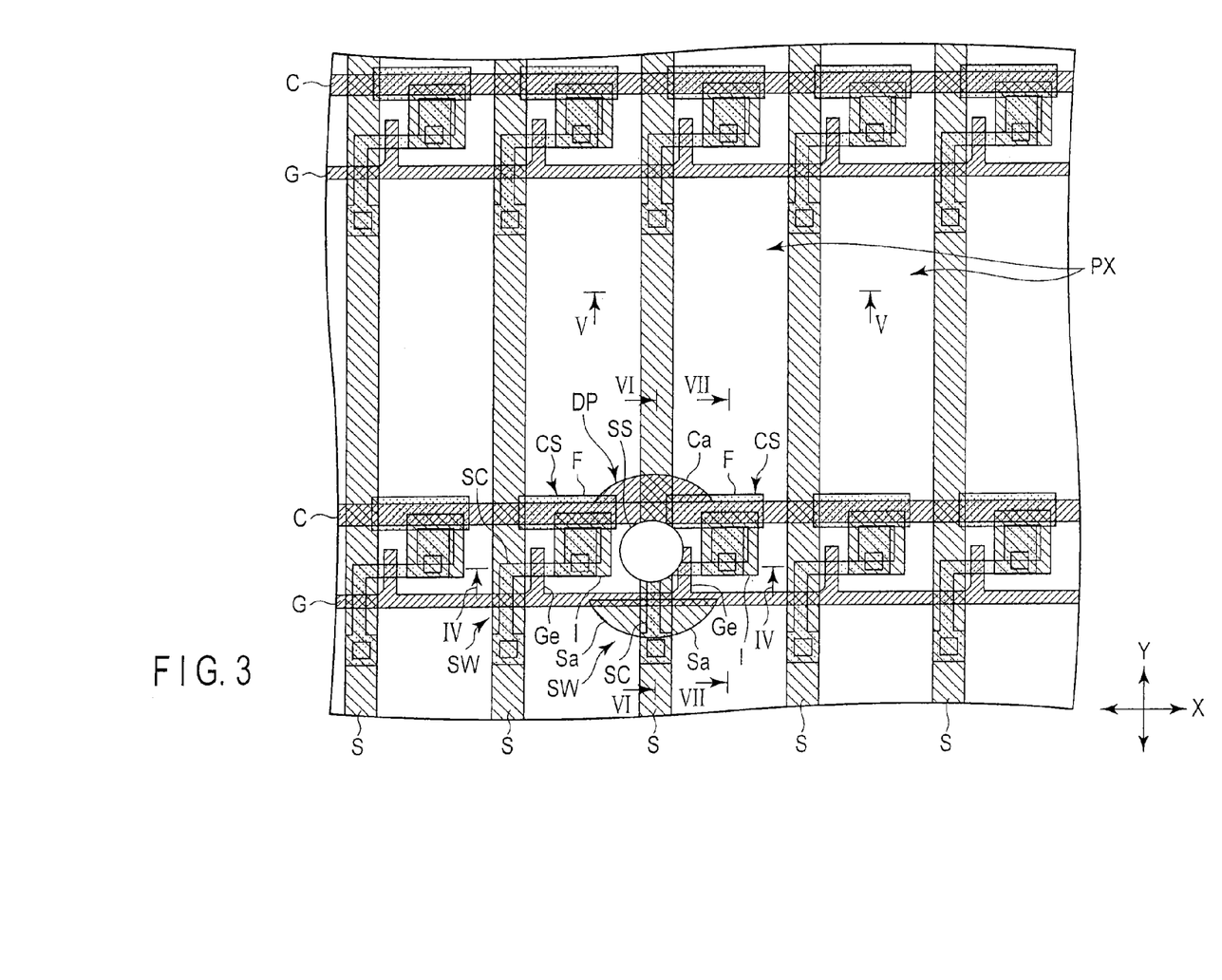
FIG. 3 is a plan view which schematically shows a plurality of pixels of the liquid crystal display panel.

FIG. 3 is a plan view which schematically shows a plurality of pixels PX of the liquid crystal display panel LPN. FIG. 3 shows only the structure on the array substrate AR side. The depiction of the pixel electrodes PE, however, is omitted.

Figure 4:
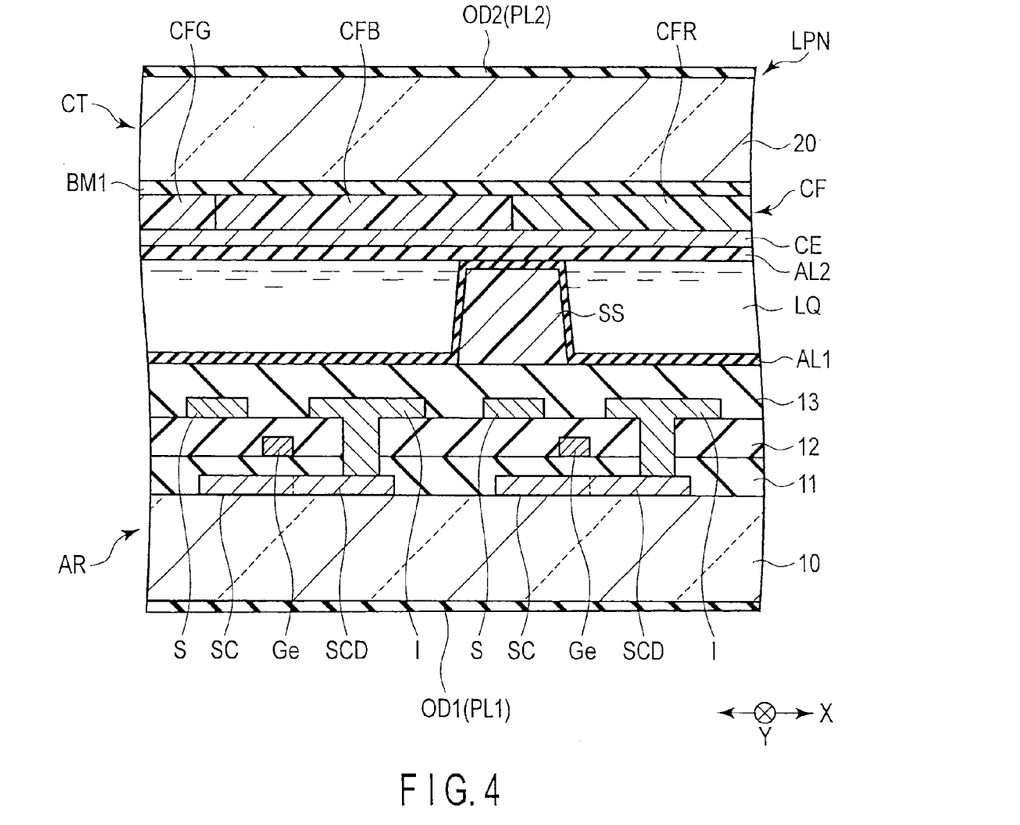
FIG. 4 is a cross-sectional view, taken along line IV-IV in FIG. 3, which shows a part of the liquid crystal display panel.
Figure 5:
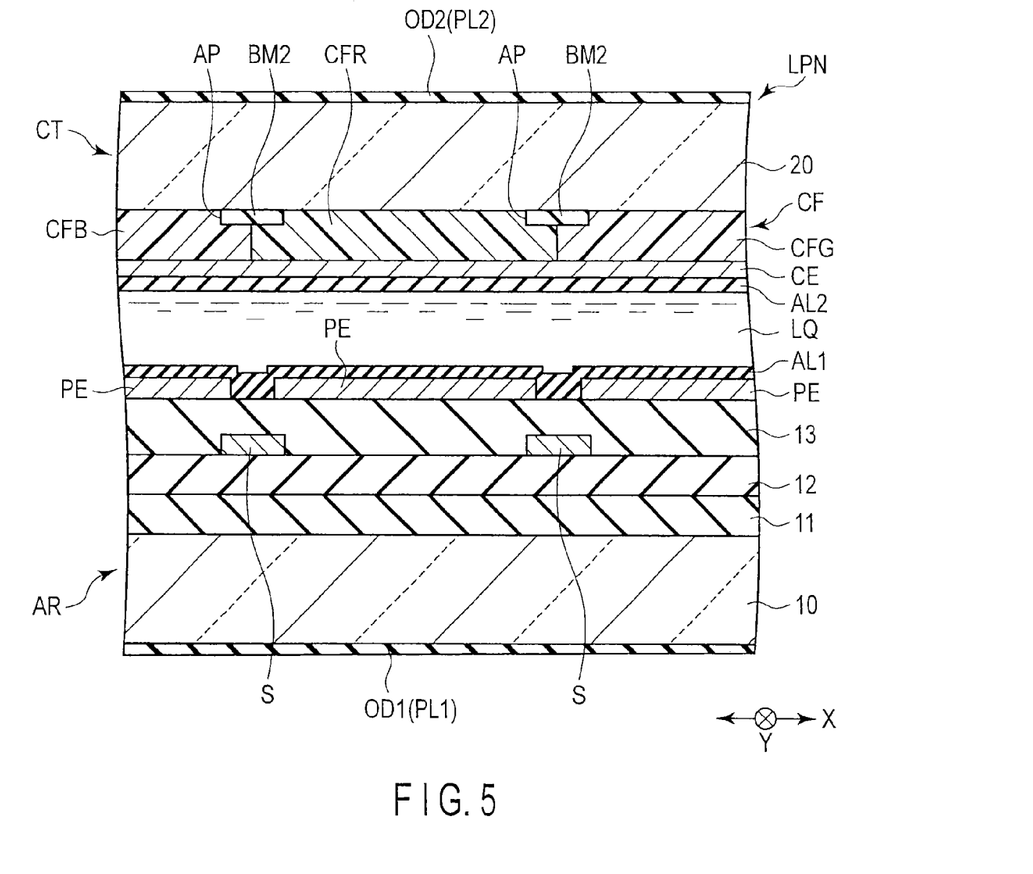
FIG. 5 is a cross-sectional view, taken along line V-V in FIG. 3, which shows a part of the liquid crystal display panel.
Figure 6:
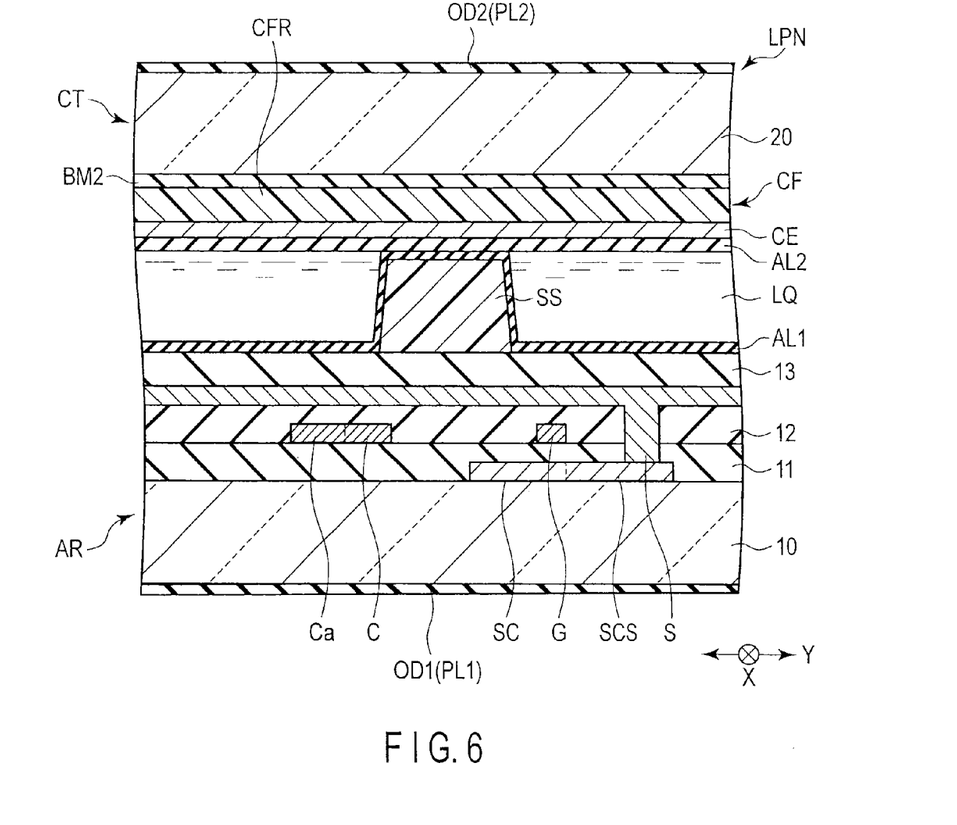
FIG. 6 is a cross-sectional view, taken along line VI-VI in FIG. 3, which shows a part of the liquid crystal display panel.
Figure 7:
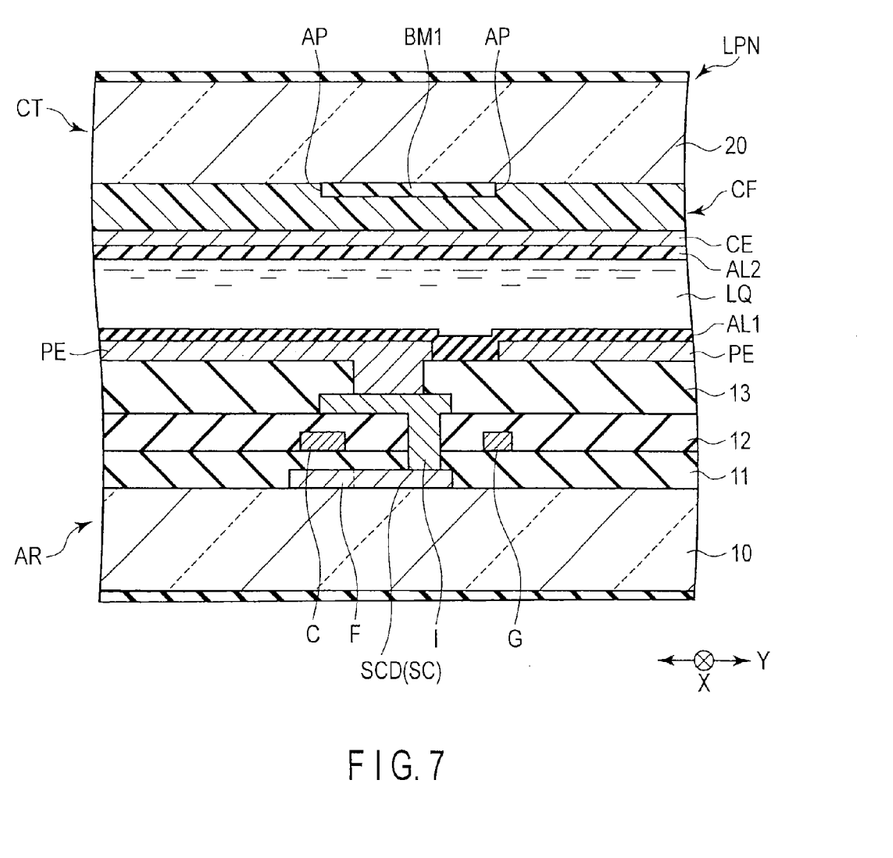
FIG. 7 is a cross-sectional view, taken along line VII-VII in FIG. 3, which shows a part of the liquid crystal display panel.

FIG. 4 is a cross-sectional view, taken along line IV-IV in FIG. 3, which shows a part of the liquid crystal display panel. FIG. 5 is a cross-sectional view, taken along line V-V in FIG. 3, which shows a part of the liquid crystal display panel. FIG. 6 is a cross-sectional view, taken along line VI-VI in FIG. 3, which shows a part of the liquid crystal display panel. FIG. 7 is a cross-sectional view, taken along line VII-VII in FIG. 3, which shows a part of the liquid crystal display panel.

As illustrated in FIG. 3, FIG. 4, FIG. 5, FIG. 6 and FIG. 7, the array substrate AR is formed by using a first insulative substrate 10 having light transmissivity, such as a glass substrate or a plastic substrate. The array substrate AR includes a switching element SW, a storage capacitance CS, a pixel electrode PE, a columnar spacer SS and a first horizontal alignment film AL1 on that side of the first insulative substrate 10, which is opposed to the counter-substrate CT.

A storage capacitance electrode F and a semiconductor layer SC are provided on the first insulative substrate 10. Incidentally, an undercoat layer, which is an insulation film, may be interposed between the first insulative substrate 10, on the one hand, and the storage capacitance electrode F and semiconductor layer SC, on the other hand.

The semiconductor layer SC and storage capacitance electrode F are provided in the same layer and are integrally formed of the same material. In the embodiment, although the storage capacitance electrode F and semiconductor layer SC are formed of polysilicon, these may be formed of amorphous silicon. The semiconductor layer SC includes a source region SCS which is opposed to the signal line S and is electrically connected to the signal line S, and a drain region SCD which is formed continuous from the storage capacitance electrode F.

The storage capacitance electrode F and semiconductor layer SC are covered with a gate insulation film 11 which functions as a first insulation film. In addition, the gate insulation film 11 is also disposed on the first insulative substrate 10.

A storage capacitance line C and a gate line G are provided on the gate insulation film 11. The storage capacitance line C extends in the second direction X and is formed in a belt shape. In the pixel PX, the storage capacitance line C is disposed at a lower side end portion. The storage capacitance line C is opposed to a plurality of storage capacitance electrodes F. The storage capacitance electrode F and storage capacitance line C form a storage capacitance CS.

The storage capacitance line C includes a plurality of projection portions Ca which cause a plurality of dot patterns DP to appear. The plural projection portions Ca are formed in a manner to protrude to the outside from one side edge of a belt portion of the storage capacitance line C. The projection portions Ca are located with a displacement from a first belt portion BM1 of a black matrix layer BM which will be described later. Since the projection portions Ca function as light shield portions, the projection portions Ca contribute to suppressing degradation in display quality due to a decrease in alignment restriction force.

The shape of the projection portion Ca is semicircular. Accordingly, the projection portion Ca can contribute to suppressing degradation in display quality, while suppressing a decrease in aperture ratio of the pixel PX. Incidentally, the shape of the projection portion Ca can be variously altered and may be, for example, triangular or trapezoidal. In this case, too, the above-described advantageous effects can be obtained. The shape of the projection portion Ca may be rectangular. In this case, compared to the above-described case, the aperture ratio of the pixel PX decreases, but the projection portion Ca can contribute to suppressing degradation in display quality.

The gate line G is provided in the same layer as the storage capacitance line C. The gate line G extends in the second direction X, and is formed in a belt shape. In the pixel PX, the gate line G is disposed at a lower side end portion. To be more specific, the gate line G is disposed to extend over a boundary between the present pixel PX and a pixel neighboring on the lower side thereof.

The gate line G is opposed to the semiconductor layer SC. The gate line G includes a gate electrode Ge which protrudes in the first direction Y. The gate electrode Ge is also opposed to the semiconductor layer SC. The semiconductor layer SC and gate line G constitute a switching element SW which is a double-gate-type thin-film transistor. In addition, in the example illustrated, the switching element SW is a top-gate-type thin-film transistor, but it may be a bottom-gate-type thin-film transistor. The storage capacitance line C and gate line G can be formed in the same fabrication step by using the same material.

A first interlayer insulation film 12 functioning as a second insulation film is provided on the gate insulation film 11, storage capacitance line C and gate line G. The storage capacitance line C and gate line G are covered with the first interlayer insulation film 12. In addition, this first interlayer insulation film 12 is also disposed on the gate insulation film 11. The gate insulation film 11 and first interlayer insulation film 12 are formed of, for example, an inorganic insulative material such as silicon oxide and silicon nitride.

Signal lines S and connection electrodes I are provided on the first interlayer insulation film 12. The signal line S extends in the first direction Y, and is formed in a belt shape. The signal line S is opposed to a source region SCS of the semiconductor layer SC. The signal line S is connected to the source region SCS of the semiconductor layer SC pass through a contact hole penetrating the gate insulation film 11 and first interlayer insulation film 12. The signal line S is disposed to extend over a boundary between the pixels PX which neighbor in the second direction X.

The signal line S includes a plurality of projection portions Sa which cause a plurality of dot patterns DP to appear. The plural projection portions Sa are formed in a manner to protrude to the outside from both side edges of a belt portion of the signal line S. The projection portions Sa are located with a displacement from the first belt portion BM1 of the black matrix layer BM which will be described later. The projection portions Sa are made to overlap a part of the gate line G, thereby preventing light leak from between the projection portions Sa and the gate line G. Since the projection portions Sa function as light shield portions, the projection portions Sa contribute to suppressing degradation in display quality due to a decrease in alignment restriction force.

The shape of the pair of projection portions Sa, which neighbor each other, is semicircular. Thus, the projection portions Sa can contribute to suppressing a decrease in display quality, while suppressing a decrease in aperture ratio of the pixel PX. Incidentally, the shape of the pair of projection portion Sa can be variously altered and may be, for example, triangular, trapezoidal or rectangular.

The storage capacitance lines C, gate lines G and signal lines S are provided in a grid shape. The dot patterns DP appear at intersection parts of the storage capacitance lines C and gate lines G, and signal lines S. In this embodiment, the shape of the dot pattern DP is circular.

The connection electrode I is opposed to the drain region SCD of the semiconductor layer SC. The connection electrode I is electrically connected to the drain region SCD of the semiconductor layer SC pass through a contact hole which penetrates the gate insulation film 11 and first interlayer insulation film 12.

The signal line S and connection electrode I can be formed in the same fabrication step by using the same material. The signal line S and connection electrode I are formed of an electrically conductive material such as molybdenum, aluminum, tungsten or titanium.

A second interlayer insulation film 13, which functions as a third insulation film, is provided on the first interlayer insulation film 12, signal lines S and connection electrodes I. The signal lines S and connection electrodes I are covered with the second interlayer insulation film 13. The second interlayer insulation film 13 is also disposed on the first interlayer insulation film 12. The second interlayer insulation film 13 is formed of various organic materials such as an ultraviolet-curing resin and a thermosetting resin. Besides, the second interlayer insulation film 13 functions also as a plantation film.

A pixel electrode PE is provided on the second interlayer insulation film 13. The pixel electrode PE is formed in a rectangular shape, and is opposed to the aperture portion of the pixel PX. Peripheral edges of the pixel electrode PE are made to overlap the storage capacitance lines C, gate lines G and signal lines S. The pixel electrode PE includes a projection portion which is opposed to the connection electrode I. The projection portion of the pixel electrode PE is electrically connected to the connection electrode I pass through a contact hole which penetrates the second interlayer insulation film 13. The pixel electrode PE is formed of an electrically conductive material with light transmissivity, such as indium tin oxide (ITO) or indium zinc oxide (IZO).

The columnar spacer SS is provided on the second interlayer insulation film 13. In this embodiment, the columnar spacer SS is provided on only the second interlayer insulation film 13, with a displacement from the pixel electrode PE, but a part of the columnar spacer SS may be provided on an end portion of the pixel electrode PE. The columnar spacer SS is located within the dot pattern DP. One columnar spacer SS is provided in each dot pattern DP. In this embodiment, the columnar spacer SS is located at a central part of the dot pattern DP. In addition, it can be said that the columnar spacer SS is located at an intersection part between the signal line S and first belt portion BM1. For example, the columnar spacers SS are formed integral with the array substrate AR by a resin material.

The first horizontal alignment film AL1 is disposed on that surface of the array substrate AR, which is opposed to the counter-substrate CT, and extends over substantially the entirety of the active area ACT. The first horizontal alignment film AL1 covers the pixel electrode PE and columnar spacer SS, and is also disposed on the second interlayer insulation film 13. The first horizontal alignment film AL1 is in contact with the liquid crystal layer LQ. The first horizontal alignment film AL1 is formed by making use of, for example, polyimide. The first horizontal alignment film AL1 is subjected to alignment treatment (rubbing treatment or optical alignment treatment) for initially aligning liquid crystal molecules.

Figure 8:
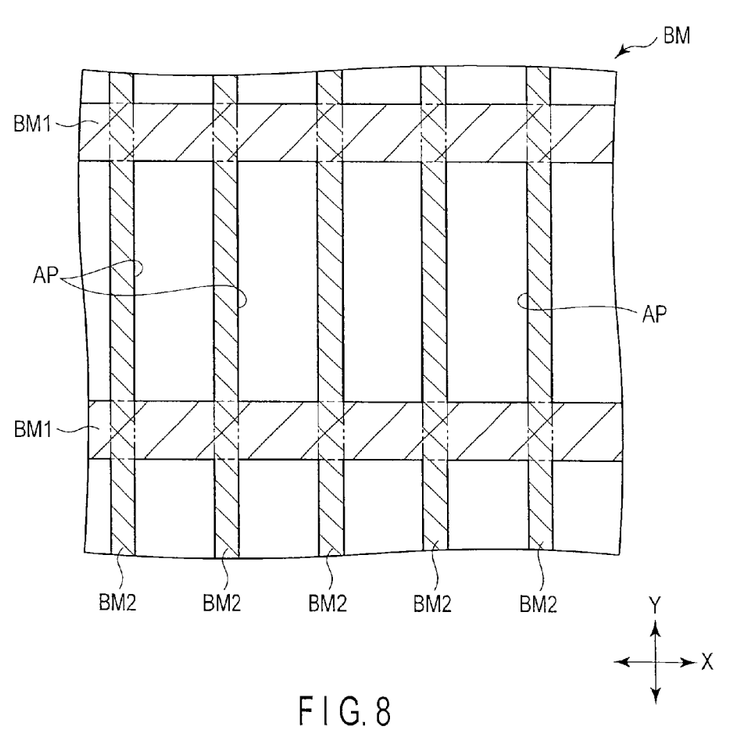
FIG. 8 is a plan view which shows a black matrix layer formed in a counter-substrate shown in FIG. 2.

FIG. 8 is a plan view which shows the black matrix layer BM formed on the counter-substrate CT shown in FIG. 2.

On the other hand, as shown in FIG. 4, FIG. 5, FIG. 6, FIG. 7 and FIG. 8, the counter-substrate CT is formed by using a second insulative substrate 20 with light transmissivity, such as a glass substrate or a plastic substrate. The counter-substrate CT includes, on that side of the second insulative substrate 20 which is opposed to the array substrate AR, the black matrix layer BM, color filter CF, common electrode CE and second horizontal alignment film AL2.

The black matrix layer BM has light-blocking properties, and is formed in a grid shape in a manner to partition the pixels PX. The black matrix layer BM includes apertures AP which are opposed to pixel electrodes PE. The black matrix layer BM includes a plurality of first belt portions BM1 and a plurality of second belt portions BM2.

The first belt portion BM1 extends in the second direction X in parallel to the gate line G and storage capacitance line C, and is formed in a belt shape. Side edges of the first belt portion BM1 are made to overlap the gate line G and storage capacitance line C. The first belt portion BM1 prevents light leak from between the gate line G and storage capacitance line C. The second belt portion BM2 extends in the first direction Y in parallel to the signal line S, and is formed in a belt shape. The second belt portion BM2 is opposed to the signal line S. In this embodiment, the width of the second belt portion BM2 is equal to the width of the signal line S.

The color filter CF is provided on the second insulative substrate 20 and black matrix layer BM. The color filter CF is disposed in association with each of the pixels PX. The color filter CF includes a red color layer CFR, a green color layer CFG and a blue color layer CFB. The respective color layers CFR, CFG and CFB are formed to extend in the first direction Y. The respective color layers CFR, CFG and CFB are disposed to be opposed to the apertures AP. The side edges of the color layers CFR, CFG and CFB extend over the black matrix layer BM (second belt portions BM2). Boundaries between the color layers are located at positions overlapping the black matrix layer BM.

Color layers of mutually different colors are disposed in pixels PX which neighbor in the second direction X. For example, the color layers are formed of resin materials which are colored in three primary colors such as red, blue and green, as described above. The color layer CFR is disposed in association with a red pixel. The color layer CFG is disposed in association with a green pixel. The color layer CFB is disposed in association with a blue pixel.

An overcoat layer (not shown) may be disposed on the color filter CF. Thereby, it is possible to reduce the effect of asperities on the surfaces of the black matrix layer BM and color filter CF.

The common electrode CE is provided on the color filter CF (overcoat layer). The common electrode CE is a solid electrode and an electrode without spaces. The common electrode CE is formed of an electrically conductive material with light transmissivity, such as ITO or IZO.

The second horizontal alignment film AL2 is disposed on that surface of the counter-substrate CT, which is opposed to the array substrate AR, and extends over substantially the entirety of the active area ACT. The second horizontal alignment film AL2 is provided on the common electrode CE, and covers the common electrode CE. The second horizontal alignment film AL2 is in contact with the liquid crystal layer LQ. The second horizontal alignment film AL2 is formed by making use of, for example, polyimide. The second horizontal alignment film AL2 is subjected to alignment treatment (rubbing treatment or optical alignment treatment) for initially aligning liquid crystal molecules.

As illustrated in FIG. 4 to FIG. 7, the array substrate AR and counter-substrate CT are disposed with a gap provided therebetween, such that their first horizontal alignment film AL1 and second horizontal alignment film AL2 are opposed to each other. The gap between the array substrate AR and counter-substrate CT is kept by the plural columnar spacers SS. The array substrate AR and counter-substrate CT are bonded by a frame-shaped sealant which is provided on peripheral portions of both substrates. The liquid crystal layer LQ is formed in a space surrounded by the array substrate AR, the counter-substrate CT and the sealant. The liquid crystal layer LQ includes liquid crystal molecules (not shown).

A first optical element OD1 is attached by, e.g. an adhesive, to an outer surface of the array substrate AR (first insulative substrate 10). The first optical element OD1 includes a first polarizer PL1 having a first polarization axis. In addition, a second optical element OD2 is attached by, e.g. an adhesive, to an outer surface of the counter-substrate CT (second insulative substrate 20). The second optical element OD2 includes a second polarizer PL2 having a second polarization axis.

As shown in FIG. 1, and FIG. 4 to FIG. 7, part of backlight from the backlight unit 4 passes through the first polarizer PL1, and enters the liquid crystal display panel LPN. The polarization state of light, which enters the liquid crystal display panel LPN, varies depending on the alignment state of liquid crystal molecules LM at a time when the light passes through the liquid crystal layer LQ. At a time of black display, the light, which has passed through the liquid crystal layer LQ, is absorbed by the second polarizer PL2. On the other hand, at a time of white display, the light, which has passed through the liquid crystal layer LQ, also passes through the second polarizer PL2.

As has been described above, the liquid crystal display device 1 is formed.

The liquid crystal display device according to the first embodiment can also defined as described below.

The paired projection portions Sa of the signal line S and the projection portion Ca of the storage capacitance line C form a dot pattern DP. The columnar spacer SS is located within the dot pattern DP.

Paying attention to four mutually neighboring pixels, it is now assumed that the upper left pixel is a first pixel, the lower left pixel is a second pixel, the upper right pixel is a third pixel and the lower right pixel is a fourth pixel. The second pixel neighbors the first pixel in the first direction Y, with the storage capacitance line C and gate line G being interposed. The third pixel neighbors the first pixel in the second direction X, with the signal line S being interposed. The fourth pixel neighbors the second pixel in the second direction X, with the signal line S being interposed, and neighbors the third pixel in the first direction Y, with the storage capacitance line C and gate line G being interposed.

One of the first projection portions Sa protrudes toward the second pixel from an intersection part between the signal line S and gate line G, and the other first projection portion Sa protrudes toward the fourth pixel from the intersection part. The second projection portion Ca protrudes toward the first pixel and third pixel from an intersection part between the signal line S and storage capacitance line C.

Figure 9:
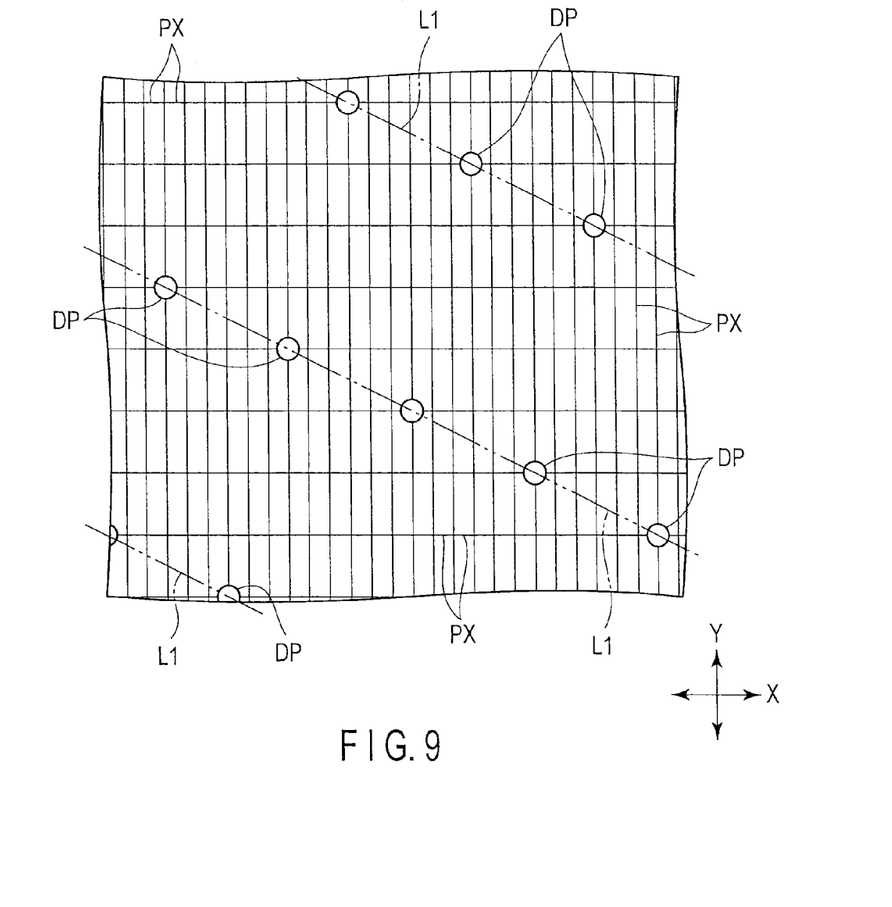
FIG. 9 is a plan view which schematically shows a positional relationship of dot patterns in relation to pixels of the liquid crystal display panel.

Next, the arrangement of the above-described dot patterns DP is described. FIG. 9 is a plan view which schematically shows a positional relationship of dot patterns DP in relation to the pixels PX of the liquid crystal display panel LPN.

As illustrated in FIG. 9, a plurality of dot patterns DP are arranged, for example, on a plurality of first straight lines L1 at intervals. In this embodiment, the plural dot patterns DP are arranged on the first straight lines L1 at regular intervals. The plural first straight lines L1 are parallel and are arranged at intervals.

Next, a description is given of the aperture ratio of the liquid crystal display panel LPN and the brightness level of a display image of the liquid crystal display device.

To begin with, the inventor measured the aperture ratio of the entire screen of the liquid crystal display panel LPN and the brightness level of a display image of the liquid crystal display device 1 according to the present embodiment. The inventor also measured the aperture ratio of the entire screen of a liquid crystal display panel and the brightness level of a display image of a liquid crystal display device according to a comparative example. Incidentally, both brightness levels were measured under the same condition. It is assumed that in the liquid crystal display device (liquid crystal display panel) of the comparative example, the storage capacitance line C is formed without plural projection portions Ca, and the signal line S is formed without plural projection portions Sa.

(Aperture Ratio)

When the aperture ratio of the entire screen of the liquid crystal display panel of the comparative example was normalized to be 1, the aperture ratio of the entire screen of the liquid crystal display panel LPN according to the embodiment was 0.99.

(Brightness Level)

When the brightness level of the display image of the liquid crystal display device of the comparative example was normalized to be 1, the brightness level of the display image of the liquid crystal display device 1 according to the embodiment was 0.99. The brightness level has a proportional relationship to the aperture ratio.

According to the liquid crystal display device of the first embodiment with the above-described structure, the liquid crystal display panel LPN comprises the array substrate AR, counter-substrate CT and liquid crystal layer LQ. The array substrate AR includes the plural wiring lines with light-blocking properties (storage capacitance lines C, gate lines G, signal lines S), the plural columnar spacers SS, and the first horizontal alignment film AL1. The counter-substrate CT includes the second horizontal alignment film AL2.

The storage capacitance line C includes the plural projection portions Ca which cause plural dot patterns DP to appear. The signal line S includes the plural projection portions Sa which cause plural dot patterns DP to appear. The columnar spacer SS is located within the dot pattern DP. The dot patterns DP are formed at only the locations where the columnar spacers SS are disposed.

There is a concern that, due to a relative misalignment between the array substrate AR and counter-substrate CT, there may occur a region where the columnar spacers SS would be displaced from normal positions and would damage the second horizontal alignment film Al2, and the alignment restriction force by the second horizontal alight film AL2 would be lost. In this region, the alignment of liquid crystal molecules would be disturbed. However, as described above, the dot patterns DP overlap regions where there is a concern that the second horizontal alignment film AL2 would be damaged (the alignment restriction force would be lost).

Thus, with the provision of dot patterns DP, it is possible to avoid such a situation that a display defect (degradation in display quality) will occur, and to avoid, for example, such a situation that luminescent points will occur on the display screen (white display will occur at a time of black display).

The dot patterns DP appear at intersection parts between the storage capacitance lines C and gate lines G, on the one hand, and the signal lines S, on the other hand. The columnar spacers SS are located at central parts of the dot patterns DP. Thus, degradation in display quality can be suppressed, while a decrease in aperture ratio of the entire screen of the liquid crystal display panel LPN (the brightness level of the display image of the liquid crystal display apparatus 1) due to the projection portions Ca and projection portions Sa can be suppressed to 1%. In addition, in this embodiment, since the shape of each dot pattern DP is circular, a further contribution can be made to suppressing a decrease in the aperture ratio (brightness level).

From the above, the liquid crystal display panel LPN which can maintain the gap between the array substrate AR and counter-substrate CT and can suppress a decrease in display quality, and the liquid crystal display device 1 including the liquid crystal display panel LPN can be obtained.

Figure 10:
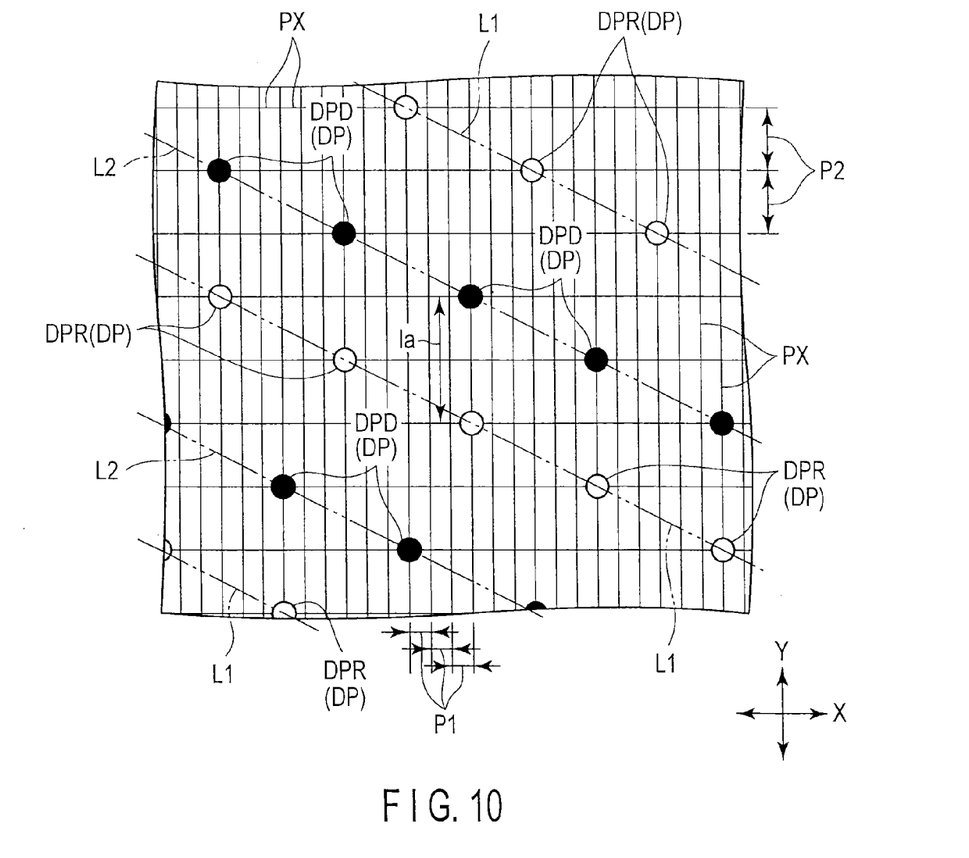
FIG. 10 is a plan view which schematically shows a positional relationship of regular patterns and dummy patterns in relation to pixels of a liquid crystal display panel of a liquid crystal display device according to a second embodiment.

Next, a liquid crystal display device according to a second embodiment is described. In this embodiment, the same functional parts as in the above-described first embodiment are denoted by like reference numerals, and a detailed description is omitted. FIG. 10 is a plan view which schematically shows a positional relationship of regular patterns and dummy patterns in relation to pixels PX of a liquid crystal display panel LPN of a liquid crystal display device 1 according to the second embodiment.

As illustrated in FIG. 10, a plurality of dot patterns DP include a plurality of regular patterns DPR and a plurality of dummy patterns DPD. It can be said that the liquid crystal display panel LPN according to this embodiment is formed by adding a plurality of dummy patterns DPD to the liquid crystal display panel LPN according to the above-described first embodiment. It can be said that the regular patterns DPR are identical to the dot patterns DP in the first embodiment. One columnar spacer SS is provided on each regular pattern DPR, and is located within each regular pattern DPR.

The dummy patterns DPD are formed similarly to the regular patterns DPR. The shape of each dummy pattern DPD is identical to the shape of each regular pattern DPR. For example, the dummy patterns DPD appear at intersection parts between the storage capacitance lines C, gate lines G and first belt portions BM1, on the one hand, and the signal lines S, on the other hand. However, no columnar spacer. SS is provided on the dummy pattern DPD.

A plurality of dummy patterns DPD are arranged on second straight lines L2 at intervals. In this embodiment, the plural dummy patterns DPD are arranged on the second straight lines L2 at regular intervals. The second straight lines L2 are lines which are parallel to the first straight lines L1 and are spaced apart from the first straight lines L1.

A pitch P1 of pixels PX in the second direction X is set in a range of 15 to 60 μm. The pitch P1 is also a pitch of signal lines S and a pitch of second belt portions BM2. A pitch P2 of pixels PX in the first direction Y is set in a range of 40 to 180 μm. The pitch P2 is also a pitch of gate lines G, a pitch of storage capacitance lines C and a pitch of first belt portions BM1.

An interval Ia between the regular pattern DPR and dummy pattern DPD is in a range of 80 to 180 μm. For example, in this embodiment, the interval Ia between the regular pattern DPR and dummy pattern DPD, which are arranged in the second direction Y, is the smallest and is 100 μm.

As described above, the liquid crystal display device 1 is formed.

Next, a description is given of the aperture ratio of the liquid crystal display panel LPN and the brightness level of a display image of the liquid crystal display device.

To begin with, the inventor measured the aperture ratio of the entire screen of the liquid crystal display panel LPN and the brightness level of a display image of the liquid crystal display device 1 according to the present embodiment. The inventor also measured the aperture ratio of the entire screen of a liquid crystal display panel and the brightness level of a display image of a liquid crystal display device according to a comparative example. Incidentally, both brightness levels were measured under the same condition. It is assumed that in the liquid crystal display device (liquid crystal display panel) of the comparative example, the storage capacitance line C is formed without plural projection portions Ca, the signal line S is formed without plural projection portions Sa, and both the regular patterns DPR and dummy patterns DPD are not formed.

(Aperture Ratio)

When the aperture ratio of the entire screen of the liquid crystal display panel of the comparative example was normalized to be 1, the aperture ratio of the entire screen of the liquid crystal display panel LPN according to the embodiment was 0.99.

(Brightness Level)

When the brightness level of the display image of the liquid crystal display device of the comparative example was normalized to be 1, the brightness level of the display image of the liquid crystal display device 1 according to the embodiment was 0.99. The brightness level has a proportional relationship to the aperture ratio.

According to the liquid crystal display device of the second embodiment with the above-described structure, the liquid crystal display panel LPN includes the array substrate AR, counter-substrate CT and liquid crystal layer LQ. The storage capacitance line C includes the plural projection portions Ca which cause plural dot patterns DP to appear. The signal line S includes the plural projection portions Sa which cause plural dot patterns DP to appear. The columnar spacer SS is located within the dot pattern DP. Therefore, the same advantageous effects as in the first embodiment can be obtained.

The plural dot patterns DP include not only plural regular patterns DPR on which columnar spacers SS are located, but also plural dummy patterns DPD which are displaced from the columnar spacers SS. The plural dummy patterns DPD are added so as to decrease the nonuniformity in dense/non-dense arrangement of plural dot patterns DP. Thereby, it is possible to avoid such a situation that the arrangement of dot patterns DP is visually recognized as stripes or nonuniformity. In the meantime, when the plural dot patterns DP do not include plural dummy patterns DPD, there is a concern that the arrangement of plural regular patterns DPR is visually recognized as stripes or nonuniformity.

In addition, by virtue of the structure in which columnar spacers SS are not provided on the dummy patterns DPD, spreading of a liquid crystal material at a time of forming the liquid crystal layer LQ is not considerably hindered, and therefore an increase in time that is needed for forming the liquid crystal layer LQ can be suppressed.

From the above, the liquid crystal display panel LPN which can maintain the gap between the array substrate AR and counter-substrate CT and can suppress degradation in display quality, and the liquid crystal display device 1 including the liquid crystal display panel LPN can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, when the aperture ratio of the entire screen of the liquid crystal display panel of the comparative example is normalized to be 1, it should suffice if the aperture ratio of the entire screen of the liquid crystal display panel LPN according to the embodiment is in a range of 0.98 to 0.99. In addition, when the brightness level of the display image of the liquid crystal display device of the comparative example is normalized to be 1, it should suffice if the brightness level of the display image of the liquid crystal display device 1 according to the embodiment is in a range of 0.98 to 0.99. Preferably, if the dot patterns DP and dummy patterns DPD are arranged so that the brightness level lowers by about 1%, compared to the liquid crystal display device without dot patterns, it becomes possible to suppress a decrease in display quality, while suppressing a decrease in aperture ratio of the entire screen of the liquid crystal display panel LPN (a decrease in brightness level of the display image of the liquid crystal display device 1). In other words, if the area occupied by only the dot patterns DP, or the area occupied by the dot patterns DP and dummy patterns DPD, is set in a range of 0.4% to 0.8% of the entire area of the display area that is composed of pixels, a decrease in display quality can be suppressed while a decrease in brightness level of the display image can be suppressed.

In addition, if the dot patterns DP and dummy patterns DPD are disposed in a manner to extend over boundaries between red and blue color filters, the respective patterns are hardly visually recognized, and degradation in display quality can be suppressed.

Figure 11:
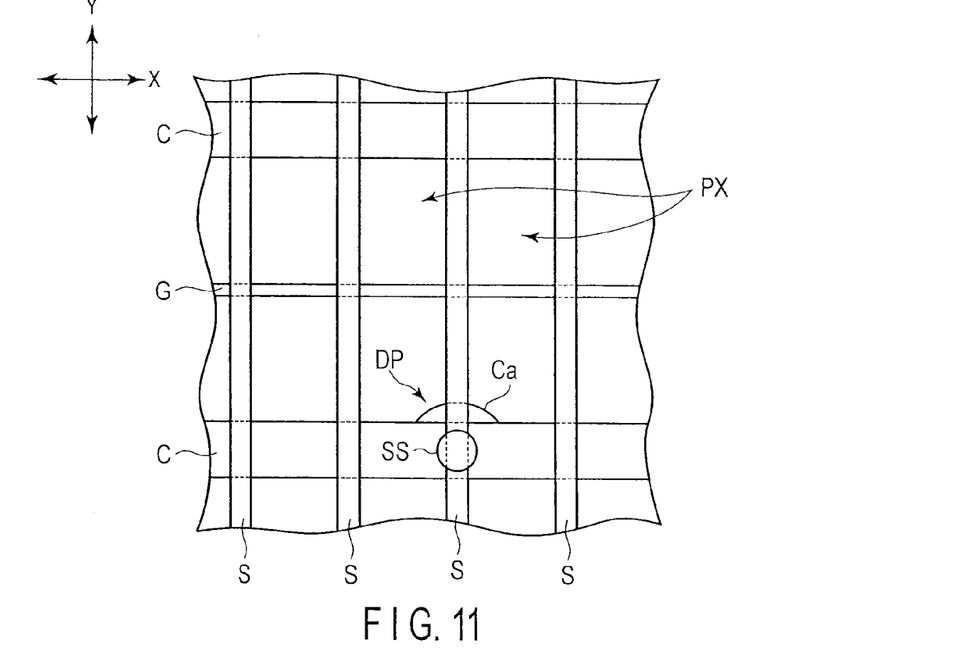
FIG. 11 is a plan view which schematically shows a modification of the array substrate of the liquid crystal display device according to the first and second embodiments, and illustrates a wiring structure.
Figure 12:
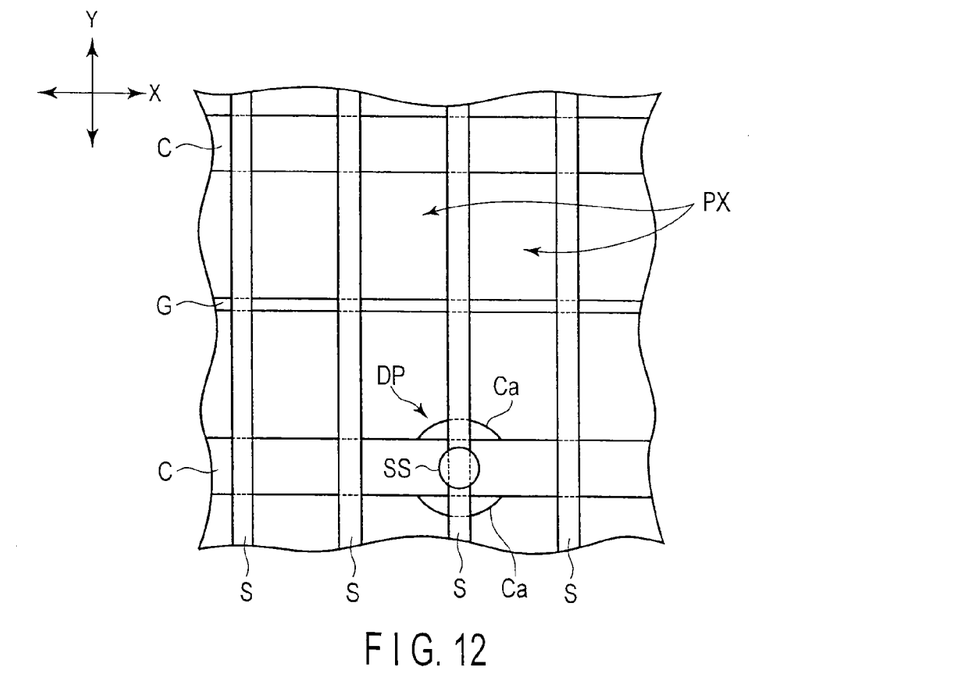
FIG. 12 is a plan view which schematically shows another modification of the array substrate of the liquid crystal display device according to the first and second embodiments, and illustrates a wiring structure.

It should suffice if at least one of the wiring lines formed on the array substrate AR includes a plurality of projection portions which cause dot patterns DP to appear. For example, as shown in FIG. 11 and FIG. 12, when the gate line G is disposed at a substantially central part of the pixel, and storage capacitance lines C are disposed in a manner to extend over boundaries between pixels PX which neighbor in the first direction Y, it should suffice if only the storage capacitance line C includes a plurality of projection portions Ca. The plural projection portions Ca may be formed on only one side edge of the belt portion of the storage capacitance line C, as shown in FIG. 11, or may be formed on both side edges, as shown in FIG. 12. Thus, the dot patterns DP can be formed at only the storage capacitance line C.

When there is no influence on the characteristics of the switching element SW, the gate line G may include a plurality of projection portions which cause a plurality of dot patterns DP to appear.

What is claimed is:

1. A liquid crystal display panel comprising:
an array substrate comprising a first wiring including a first projection portion, and a second wiring which is perpendicular to the first wiring;
a counter-substrate comprising a first belt portion extending in a belt shape in parallel to the first wiring and overlapping the first wiring, and a second belt portion extending in a belt shape in parallel to the second wiring and overlapping the second wiring; and
a liquid crystal layer held between the array substrate and the counter-substrate,
wherein
at least a part of the first projection portion is located with a displacement from the first belt portion, and is opposed to the second wiring,
the first wiring is a signal line, and
the second wiring is either one of a gate line and a storage capacitance line.

2. The liquid crystal display panel of claim 1, wherein
the array substrate further comprises a third wiring which is perpendicular to the first wiring,
the second belt portion further overlaps the third wiring,
the third wiring includes a second projection portion,
at least a part of the second projection portion is located with a displacement from the first belt portion, and is opposed to the first wiring,
the first projection portion is protruded from a first edge of the first belt portion to an outside of the first belt portion, and
the second projection portion is protruded from a second edge of the first belt portion to the outside of the first belt portion.

3. The liquid crystal display panel of claim 1, wherein
the first wiring further includes a second projection portion,
at least a part of the second projection portion is located with a displacement from the first belt portion, and is opposed to the second wiring,
the first projection portion is protruded from a first edge of the first belt portion to an outside of the first belt portion, and
the second projection portion is protruded from a second edge of the first belt portion to the outside of the first belt portion.

4. The liquid crystal display panel of claim 2, wherein
the array substrate further comprises an insulation film which is provided between the first wiring and the second wiring, and
the second wiring and the third wiring are covered with the insulation film.

5. The liquid crystal display panel of claim 1, wherein
a shape of the first projection portion is semicircular, triangular, or rectangular.

6. A liquid crystal display panel comprising:
an array substrate comprising a first wiring including a first projection portion, and a second wiring which is perpendicular to the first wiring;
a counter-substrate comprising a first belt portion extending in a belt shape in parallel to the first wiring and overlapping the first wiring, and a second belt portion extending in a belt shape in parallel to the second wiring and overlapping the second wiring;
a liquid crystal layer held between the array substrate and the counter-substrate; and
a spacer disposed between the array substrate and the counter-substrate,
wherein
at least a part of the spacer is opposed to an intersection part between the first belt portion and the second belt portion,
at least a part of the first projection portion is located with a displacement from the first belt portion, and is opposed to the second wiring,
the first wiring is a signal line, and
the second wiring is either one of a gate line and a storage capacitance line.

7. The liquid crystal display panel of claim 6, wherein
the array substrate further comprises a third wiring which is perpendicular to the first wiring,
the second belt portion further overlaps the third wiring,
the third wiring includes a second projection portion,
at least a part of the second projection portion is located with a displacement from the first belt portion, and is opposed to the first projection portion in a plan view,
the first projection portion is protruded from a first edge of the second belt portion to an outside of the second belt portion, and
the second projection portion is protruded from a second edge of the second belt portion to the outside of the second belt portion.

8. The liquid crystal display panel of claim 6, wherein
the first wiring further includes a second projection portion,
at least a part of the second projection portion is located with a displacement from the first belt portion, and is opposed to the second wiring, the first projection portion is protruded from a first edge of the first belt portion to an outside of the first belt portion, and the second projection portion is protruded from a second edge of the first belt portion to the outside of the first belt portion.

9. The liquid crystal display panel of claim 7, wherein the array substrate further comprises an insulation film which is provided between the first wiring and the second wiring, and the second wiring and the third wiring are covered with the insulation film.

10. The liquid crystal display panel of claim 6, wherein a shape of the first projection portion is semicircular, triangular, or rectangular.

\* \* \* \* \*